US012614504B2

(12) United States Patent
Pyun et al.

(10) Patent No.: US 12,614,504 B2
(45) Date of Patent: Apr. 28, 2026

(54) TIMING CONTROLLER, A DISPLAY DEVICE, AND A DRIVING METHOD THEREOF

(71) Applicant: SAMSUNG DISPLAY CO., LTD., Yongin-si (KR)

(72) Inventors: Ki Hyun Pyun, Yongin-si (KR); Deok Ho Kang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 354 days.

(21) Appl. No.: 18/218,241

(22) Filed: Jul. 5, 2023

(65) Prior Publication Data

US 2024/0105105 A1 Mar. 28, 2024

(30) Foreign Application Priority Data

Sep. 27, 2022 (KR) ........................ 10-2022-0122879

(51) Int. Cl.
*G09G 3/32* (2016.01)

(52) U.S. Cl.
CPC ....... *G09G 3/32* (2013.01); *G09G 2310/0275* (2013.01); *G09G 2310/08* (2013.01)

(58) Field of Classification Search
CPC .............. G09G 3/32; H04L 7/00; H04L 7/033
USPC ........................................................... 345/55
See application file for complete search history.

(56) References Cited

U.S. PATENT DOCUMENTS

| | | | |
|---|---|---|---|
| 7,907,693 B2 | 3/2011 | Bae et al. | |
| 7,974,375 B2 | 7/2011 | Kim et al. | |
| 8,050,372 B2 | 11/2011 | Lee | |
| 2004/0240567 A1* | 12/2004 | Akita | H04L 25/063 375/259 |
| 2021/0125563 A1* | 4/2021 | Pyun | G09G 3/3266 |
| 2021/0280125 A1 | 9/2021 | Kim et al. | |
| 2022/0028320 A1 | 1/2022 | Kim et al. | |
| 2022/0148515 A1* | 5/2022 | Hong | G09G 5/006 |

FOREIGN PATENT DOCUMENTS

| | | |
|---|---|---|
| KR | 10-0885888 | 2/2009 |
| KR | 10-0915387 | 9/2009 |
| KR | 10-1301698 | 8/2013 |
| KR | 10-2021-0113530 | 9/2021 |
| KR | 10-2022-0012603 | 2/2022 |

* cited by examiner

*Primary Examiner* — Mark Edwards
(74) *Attorney, Agent, or Firm* — F. CHAU & ASSOCIATES, LLC

(57) ABSTRACT

A display device including: pixels connected to data lines; a data driver configured to provide data voltages to the data lines; and a timing controller connected to the data driver through a clock training line and a clock data line, wherein the timing controller provides a clock training pattern to the clock data line when the timing controller provides a clock training signal having a first logic level to the clock training line, and provides a clock data signal to the clock data line when the timing controller provides the clock training signal having a second logic level to the clock training line, and wherein the timing controller provides a first configuration signal for a next clock training pattern when the clock training signal having the second logic level is provided to the clock training line.

30 Claims, 16 Drawing Sheets

FIG. 11

| TP[2:0] | Sub-pattern period (1T = 10UI) |
|---|---|
| 000 | 2T |
| 001 | 3T |
| 010 | 4T |
| 011 | 5T |
| 100 | 6T |
| 101 | 7T |
| 110 | 8T |
| 111 | 9T |

FIG. 12

| TU[3:0] | Initial-level period |
|---|---|
| 0000 | 1UI |
| 0001 | 2UI |
| 0010 | 3UI |
| 0011 | 4UI |
| 0100 | 5UI |
| 0101 | 6UI |
| 0110 | 7UI |
| 0111 | 8UI |
| 1000 | 9UI |

TIMING CONTROLLER, A DISPLAY DEVICE, AND A DRIVING METHOD THEREOF

CROSS-REFERENCE TO RELATED APPLICATION

The present application claims priority under 35 U.S.C. § 119(a) to Korean patent application No. 10-2022-0122879 filed on Sep. 27, 2022 in the Korean Intellectual Property Office, the disclosure of which is incorporated by reference herein in its entirety.

1. TECHNICAL FIELD

The present disclosure relates to a timing controller, a display device, and a driving method thereof.

2. RELATED ART

An information technology continues to develop, the importance of a display device, which is a connection medium between a user and information, increases. Accordingly, high quality display devices such as a liquid crystal display device and an organic light emitting display device are increasingly used.

A display device may include a clock and data recovery (CDR) circuit. The CDR circuit may be periodically provided with a clock training pattern to periodically recover the frequency and phase of a clock signal in the display device.

When the clock training pattern is provided as a regular repetitive pattern, Inter-Symbol Interference (ISI) jitter or a noise concentration phenomenon may result.

SUMMARY

Embodiments of the present disclosure provide a timing controller, a display device, and a driving method thereof, in which various clock training patterns are transmitted, so that ISI jitter, a noise concentration phenomenon, or the like can be coped with.

Embodiments of the present disclosure also provide a timing controller, a display device, and a driving method thereof, in which configuration information on various clock training patterns are provided in advance, so that the locking time of a clock signal can be decreased.

In accordance with an embodiment of the present disclosure, there is provided a display device including: pixels connected to data lines; a data driver configured to provide data voltages to the data lines; and a timing controller connected to the data driver through a clock training line and a clock data line, wherein the timing controller provides a clock training pattern to the clock data line when the timing controller provides a clock training signal having a first logic level to the clock training line, and provides a clock data signal to the clock data line when the timing controller provides the clock training signal having a second logic level to the clock training line, and wherein the timing controller provides a first configuration signal for a next clock training pattern when the clock training signal having the second logic level is provided to the clock training line.

The clock training pattern includes sub-patterns.

The first configuration signal includes sub-pattern period setting values indicating periods of the respective sub-patterns.

The first configuration signal further includes initial-level period setting values indicating periods in which initial levels of the respective sub-patterns are maintained.

Each of the sub-patterns includes at least two unit data, wherein the unit data have the same time length, and wherein an initial bit of each of the unit data is a transition bit having a logic level different from a logic level of a previous bit.

Each of the unit data maintains a third logic level during a first period of its corresponding sub-pattern, and maintains a fourth logic level during a second period of its corresponding sub-pattern.

The sub-pattern period setting values indicate a number of the unit data which a corresponding sub-pattern includes.

The initial-level period setting values indicate a period in which the third logic level of a first unit data of a corresponding sub-pattern is maintained.

The first configuration signal indicates that subsequent data is frame data.

The timing controller further provides a second configuration signal when the clock training signal having the second logic level is provided to the clock training line, and wherein the second configuration signal indicates that subsequent data is pixel data or dummy data.

In accordance with an embodiment of the present disclosure, there is provided a method of driving a display device including: pixels connected to data lines; a data driver configured to provide data voltages to the data lines; and a timing controller connected to the data driver through a clock training line and a clock data line, the method including: providing, from the timing controller, a clock training pattern to the clock data line when the timing controller provides a clock training signal having a first logic level to the clock training line; and providing, from the timing controller, a clock data signal to the clock data line when the timing controller provides the clock training signal having a second logic level to the clock training line, wherein the timing controller provides a first configuration signal for a next clock training pattern when the clock training signal having the second logic level is provided to the clock training line.

In accordance with an embodiment of the present disclosure, there is provided a timing controller including a first terminal and a second terminal, wherein the timing controller is configured to provide a clock training pattern to the second terminal when the timing controller provides a clock training signal having a first logic level to the first terminal, and to provide a clock data signal to the second terminal when the timing controller provides the clock training signal having a second logic level to the first terminal, and wherein the timing controller is further configured to provide a first configuration signal for a next clock training pattern when the clock training signal having the second logic level is provided to the first terminal.

BRIEF DESCRIPTION OF THE DRAWINGS

FIG. 11 is a diagram illustrating sub-pattern period setting values of a first configuration signal in accordance with an embodiment of the present disclosure.

FIG. 12 is a diagram illustrating initial-level period setting values of the first configuration signal in accordance with an embodiment of the present disclosure.

DETAILED DESCRIPTION OF THE EMBODIMENTS

Figure 1:
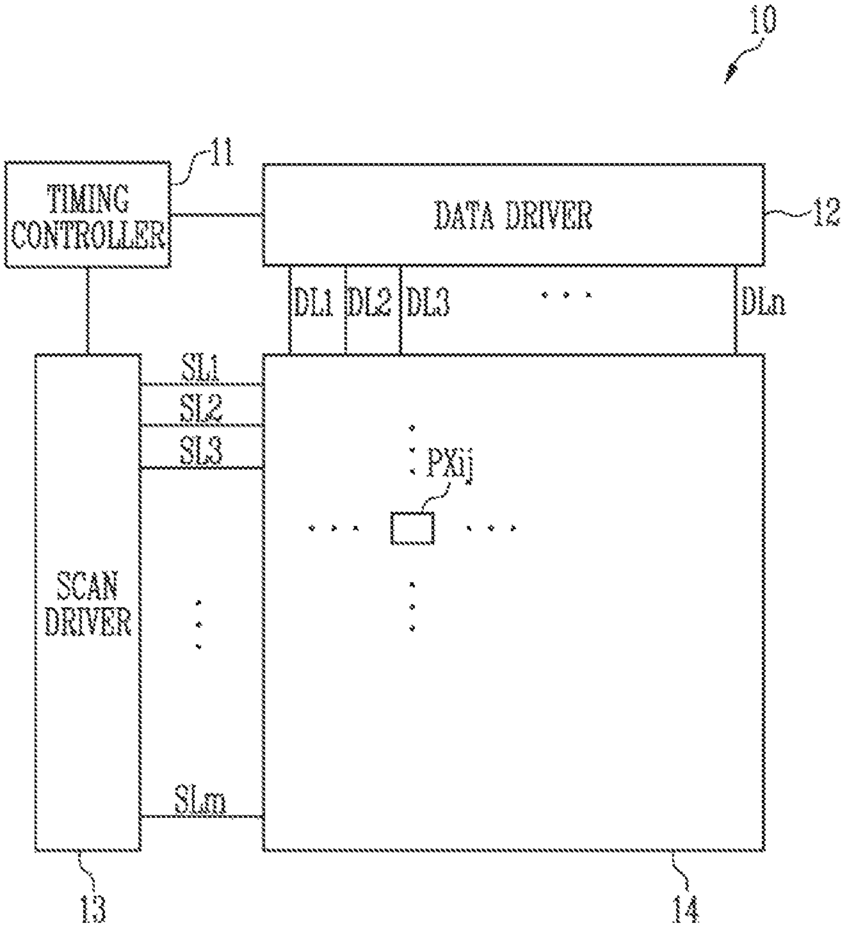
FIG. 1 is a diagram illustrating a display device in accordance with an embodiment of the present disclosure.

Example embodiments of the present disclosure will now be described more fully hereinafter with reference to the accompanying drawings; however, the present disclosure may be embodied in different forms and should not be construed as limited to the embodiments set forth herein.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout the specification.

In the detailed description, the expression "equal" may mean "substantially equal." For example, this may mean equality to a degree to which those skilled in the art can understand the equality.

FIG. 1 is a diagram illustrating a display device in accordance with an embodiment of the present disclosure.

Referring to FIG. 1, the display device 10 in accordance with the embodiment of the present disclosure may include a timing controller 11, a data driver 12, a scan driver 13, and a pixel unit 14.

The timing controller 11 may receive grayscale values for each frame and control signals from an external processor. The timing controller 11 may render grayscales to correspond to specifications of the display device 10. For example, the external processor may provide a red grayscale, a green grayscale, and a blue grayscale with respect to each unit dot. However, for example, when the pixel unit 14 has a PENTILE™ structure, adjacent unit dots share a pixel with each other, and hence pixels may not correspond one-to-one to the respective grayscales. Therefore, it is necessary to render the grayscales. Grayscales which are rendered or are not rendered may be provided to the data driver 12. In addition, the timing controller 11 may provide the data driver 12, the scan driver 13, and the like with control signals suitable for specifications of the data driver 12, the scan driver 13, and the like for the purpose of frame display.

The data driver 12 may generate data to be provided to data lines DL1, DL2, DL3, DL4, . . . , and DLn by using the grayscale values and the data control signals. For example, the data driver 12 may sample grayscale values by using a clock signal, and apply data voltages corresponding to the grayscale values to the data lines DL1 to DLn in units of pixel rows. Here, n may be an integer greater than 0.

The scan driver 13 may receive a clock signal, a scan start signal, and the like from the timing controller 11, thereby generating scan signals to be provided to scan lines SL1, SL2, SL3, . . . , and SLm. Here, m may be an integer greater than 0.

The scan driver 13 may sequentially supply scan signals having a pulse of a turn-on level to the scan lines SL0 to SLm. The scan driver 13 may include scan stages configured in the form of shift registers. The scan driver 13 may generate the scan signals in a manner that sequentially transfers the scan start signal in the form of a pulse of a turn-on level to a next scan stage under the control of the clock signal.

The pixel unit 14 includes pixels. Each pixel PXij may be connected to a corresponding data line of the data lines DL1, DL2, DL3, DL4, . . . , and DLn and a corresponding scan line of the scan lines SL1, SL2, SL3, . . . , and SLm. Here, i and j may be integers greater than 0. The pixel PXij may be a pixel connected to an ith scan line and a jth data line.

Figure 2:
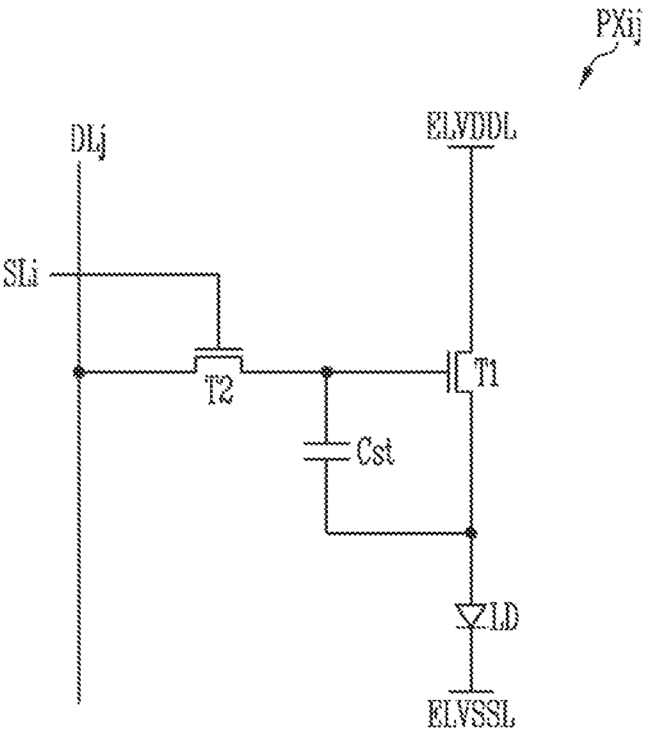
FIG. 2 is a diagram illustrating a pixel in accordance with an embodiment of the present disclosure.

FIG. 2 is a diagram illustrating a pixel in accordance with an embodiment of the present disclosure.

Referring to FIG. 2, the pixel PXij includes transistors T1 and T2, a storage capacitor Cst, and a light emitting diode LD.

Hereinafter, a circuit implemented with an N-type transistor is described as an example. However, those skilled in the art may design a circuit implemented with a P-type transistor by changing the polarity of a voltage applied to a gate terminal of one of the transistors T1 and T2. Similarly, those skilled in the art may design a circuit implemented with a combination of the P-type transistor and the N-type transistor. The P-type transistor refers to a transistor in which an amount of current flowing when the difference in voltage between a gate electrode and a source electrode increases in a negative direction. The N-type transistor refers to a transistor in which an amount of current flowing when the difference in voltage between a gate electrode and a source electrode increases in a positive direction. The transistor may be configured in various forms including a Thin Film Transistor (TFT), a Field Effect Transistor (FET), a Bipolar Junction Transistor (BJT), and the like.

A gate electrode of a first transistor T1 may be connected to a first electrode of the storage capacitor Cst, a first electrode of the first transistor T1 may be connected to a first power line ELVDDL, and a second electrode of the first transistor T1 may be connected to a second electrode of the storage capacitor Cst. The first transistor T1 may be referred to as a driving transistor.

A gate electrode of a second transistor T2 may be connected to an ith scan line SLi, a first electrode of the second transistor T2 may be connected to a jth data line DLj, and a second electrode of the second transistor T2 may be connected to the gate electrode of the first transistor T1 and the first electrode of the storage capacitor Cst. The second transistor T2 may be referred to as a scan transistor.

An anode of the light emitting diode LD may be connected to the second electrode of the first transistor T1 and the second electrode of the storage capacitor Cst, and a cathode of the light emitting diode LD may be connected to a second power line ELVSSL. The light emitting diode LD may be configured as an organic light emitting diode, an inorganic light emitting diode, a quantum dot light emitting diode, or the like.

A first power voltage may be applied to the first power line ELVDDL, and a second power voltage may be applied to the second power line ELVSSL. During a display period, the first power voltage may be higher than the second power voltage.

When a scan signal having a turn-on level (e.g., a high level) is applied through the scan line SLi, the second transistor T2 is in a turn-on state. A data voltage applied to the data line DLj is stored in the first electrode of the storage capacitor Cst.

A positive driving current corresponding to a voltage difference between the first electrode and the second electrode of the storage capacitor Cst flows between the first electrode and the second electrode of the first transistor T1. Accordingly, the light emitting diode LD emits light with a luminance corresponding to the data voltage.

Next, when a scan signal having a turn-off level (e.g., a low level) is applied through the scan line SLi, the second transistor T2 is turned off, and the data line DLj and the first electrode of the storage capacitor Cst are electrically separated from each other. Thus, although the data voltage of the data line DLj is changed, the voltage stored in the first electrode of the storage capacitor Cst is not changed.

Embodiments of the present disclosure may be applied to not only the pixel PXij shown in FIG. 2 but also a pixel of another circuit.

Figure 3:
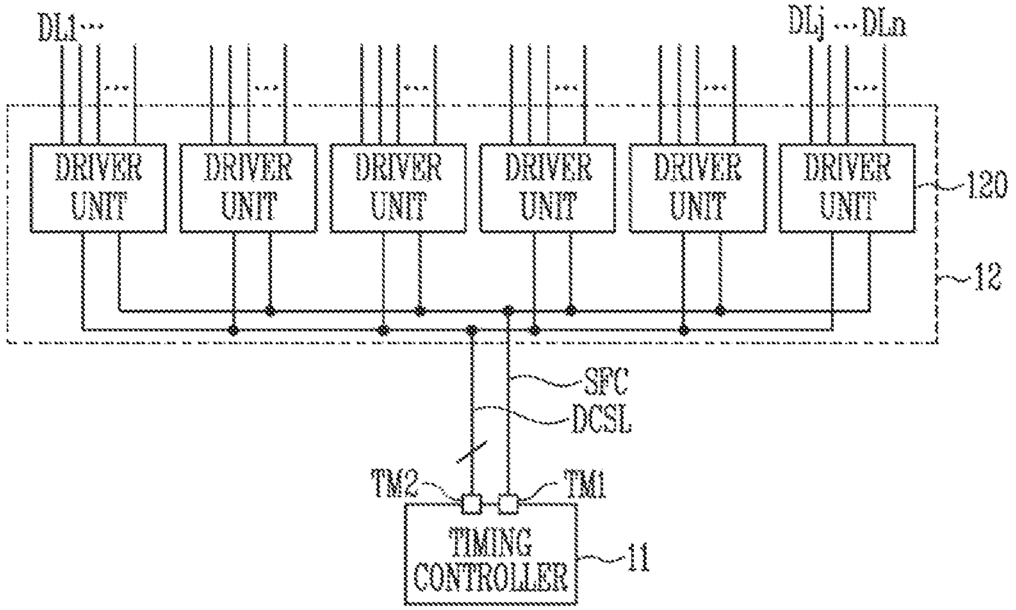
FIG. 3 is a diagram illustrating a data driver in accordance with an embodiment of the present disclosure.

FIG. 3 is a diagram illustrating a data driver in accordance with an embodiment of the present disclosure.

Referring to FIG. 3, the data driver 12 in accordance with the embodiment of the present disclosure may include one or a plurality of driver units 120. When the display device 10 includes only one driver unit 120, the driver unit 120 and the data driver 12 may be the same. All of the data lines DL1 to DLn may be connected to the one driver unit 120. As shown in FIG. 3, when the display device 10 includes a plurality of driver units 120, the data lines DL1 to DLn may be grouped, and each data line group may be connected to a corresponding driver unit 120. For example, one group of data lines DLj to DLn may be connected to one driver unit 120.

The driver unit 120 may use one clock training line SFC as a common bus line. For example, the timing controller 11 may simultaneously transfer a notification signal, which notifies that a clock training pattern is supplied to all the driver units 120, through the one clock training line SFC.

The driver unit 120 may be connected to the timing controller 11 through a dedicated clock data line DCSL. For example, when the display device 10 includes a plurality of driver units 120, the driver units 120 may be respectively connected to the timing controller 11 through a plurality of clock data lines DCSL.

The clock data line DCSL of the driver unit 120 may be provided in at least one. However, when it is not sufficient to achieve a desired bandwidth of a transmission signal by using only one clock data line DCSL, a plurality of clock data lines DCSL may be connected to each driver unit 120. In addition, even when the clock data line DCSL is configured as a differential signal line to remove common mode noise, each driver unit 120 may require a plurality of clock data lines DCSL.

The timing controller 11 may include a first terminal TM1 and a second terminal TM2, though which the timing controller 11 can be connected to the outside. The first terminal TM1 may be connected to the clock training line SFC, and the second terminal TM2 may be connected to the clock data line DCSL.

When the timing controller 11 provides a clock training signal having a first logic level to the first terminal TM1, the timing controller 11 may provide a clock training pattern to the second terminal TM2. When the timing controller 11 provides the clock training signal having a second logic level to the first terminal TM1, the timing controller 11 may provide the second terminal TM2 with a clock data signal instead of the clock training pattern.

Figure 4:
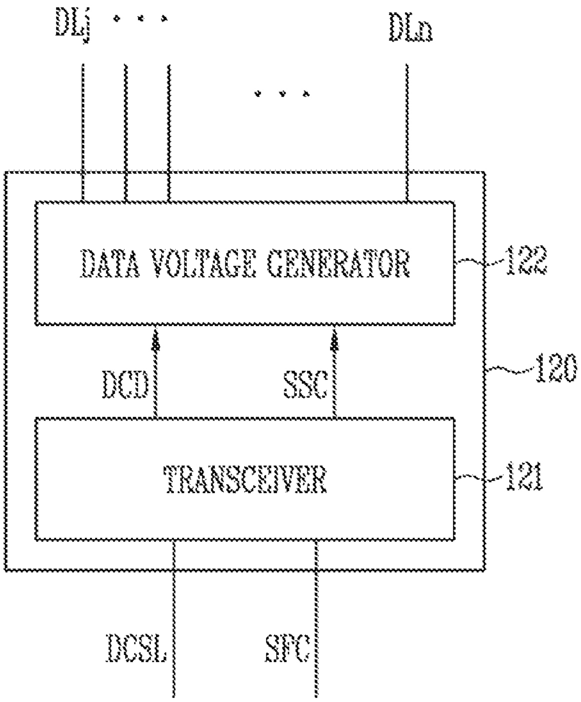
FIG. 4 is a diagram illustrating a driver unit in accordance with an embodiment of the present disclosure.

FIG. 4 is a diagram illustrating a driver unit in accordance with an embodiment of the present disclosure.

Referring to FIG. 4, the driver unit 120 in accordance with the embodiment of the present disclosure may include a transceiver 121 and a data voltage generator 122.

The transceiver 121 may receive a clock data signal from the timing controller 11 through the clock data line DCSL. The transceiver 121 may receive a clock training signal from the timing controller 11 through the clock training line SFC.

The transceiver 121 may generate a clock signal by using the clock training signal and the clock data signal, and sample a data signal DCD from the clock data signal by using the generated clock signal. The transceiver 121 may provide the sampled data signal DCD to the data voltage generator 122. In addition, the transceiver 121 may provide a source shift clock SSC to the data voltage generator 122.

The data voltage generator 122 may receive the data signal DCD and the source shift clock SSC from the transceiver 121. The data voltage generator 122 may generate data voltages by using the source shift clock SSC and the data signal DCD.

The data voltage generator 122 may apply, to data lines DLj to DLn, data voltages corresponding to grayscale values of pixels connected to a scan line, in synchronization with a period in which a scan signal having a turn-on level is applied to the corresponding scan line. For example, when the scan signal having the turn-on level is applied to the scan line SLi, the data voltage generator 122 may apply, to the data line DLj, a data voltage corresponding to a grayscale value of the pixel PXij.

Figure 5:
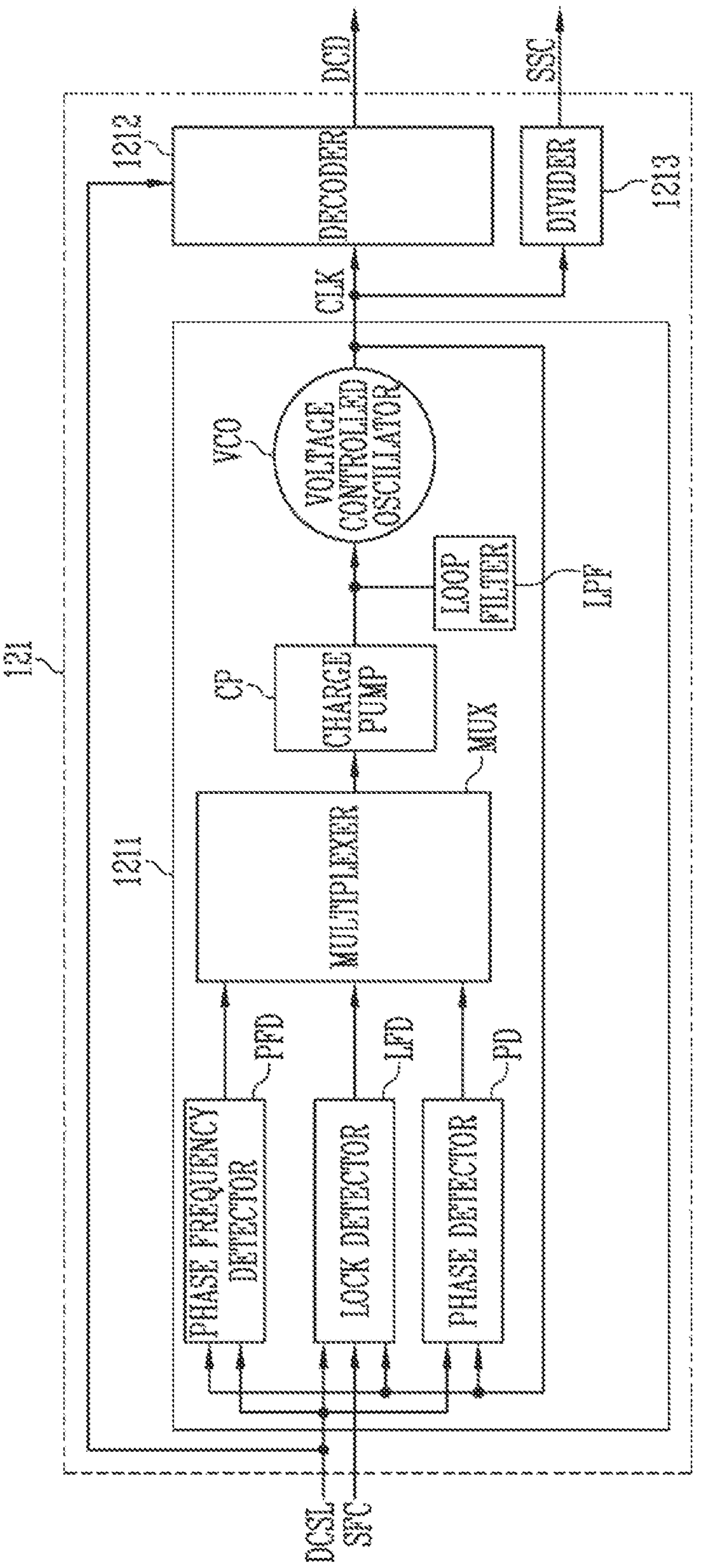
FIG. 5 is a diagram illustrating a transceiver in accordance with an embodiment of the present disclosure.

FIG. 5 is a diagram illustrating a transceiver in accordance with an embodiment of the present disclosure.

Referring to FIG. 5, the transceiver 121 in accordance with the embodiment of the present disclosure may include a clock data recovery circuit 1211, a decoder 1212, and a divider 1213.

The clock data recovery circuit 1211 may generate a clock signal CLK by using a clock training signal provided through the clock training line SFC and a clock data signal provided through a clock data line DCSL. The clock data recovery circuit 1211 may also be referred to as a "clock and data recovery circuit".

The decoder 1212 may sample a data signal DCD from the clock data signal by using the clock signal CLK.

The divider 1213 may generate a source shift clock SSC having a converted frequency by using the clock signal CLK.

The clock data recovery circuit 1211 in accordance with the embodiment of the present disclosure may include a phase frequency detector PFD, a lock detector LFD, a phase detector PD, a multiplexer MUX, a charge pump CP, a loop filter LPF, and a voltage controlled oscillator VCO.

The timing controller 11 may apply a clock training signal having a first level (e.g., a logic low level) to the clock training line SFC in at least a partial period of a vertical blank period, and apply a clock training signal having a second level (e.g., a logic high level) to clock training line SFC in another period of the vertical blank period and an active data period. In addition, when the clock training signal having the first level is applied, the timing controller 11 may apply a clock training pattern CTP to the clock data line DCSL (see FIGS. 7 and 8).

The voltage controlled oscillator VCO may generate the clock signal CLK, based on a control voltage supplied from the loop filter LPF.

The phase frequency detector PFD may generate a first up signal or a first down signal by comparing the clock signal CLK and the clock training pattern CTP with each other.

The lock detector LFD may detect whether the clock signal CLK has been locked by comparing the clock signal CLK and the clock training pattern CTP with each other, while receiving the clock training signal having the first level. For example, when the locking of the clock signal CLK fails while the lock detector LFD receives the clock training signal having the first level, the lock detector LFD may provide a lock fail signal to the multiplexer MUX.

When the multiplexer MUX receives the lock fall signal, the multiplexer MUX may pass the first up signal or the first down signal of the phase frequency detector PFD. The multiplexer MUX may not pass an output signal of the phase detector PD. In other words, the phase frequency detector PFD may mainly contribute to generation of the clock signal CLK in a clock training period.

The charge pump CP may increase a charge supply amount according to the first up signal output from the multiplexer MUX, or decrease the charge supply amount according to the first down signal output from the multiplexer MUX.

The loop filter LPF may include, for example, a capacitor. The loop filter LPF may generate a control voltage with respect to a ground at one end of the capacitor, corresponding to the charge supply amount of the charge pump CP. The control voltage may be applied to the voltage controlled oscillator VCO, and the voltage controlled oscillator VCO may generate the clock signal CLK of which frequency or phase is controlled according to the control voltage.

When the locking of the clock signal CLK succeeds after such a series of processes, the lock detector LFD may provide a lock success signal to the multiplexer MUX. For example, the lock success signal and the lock fail signal may be voltage signals having different logic levels, which are provided to the same signal line.

When the multiplexer MUX receives the lock success signal, the multiplexer MUX may pass an output signal of the phase detector PD, and may not pass an output signal of the phase frequency detector PFD. In other words, the phase detector PD may mainly contribute to maintenance of the clock signal CLK in the active data period.

The phase detector PD may generate a second up signal or a second down signal by comparing the clock signal CLK and the clock data signal with each other. The clock data signal may include data (e.g., a transition bit AD) for maintaining the clock signal CLK at a constant time interval (see FIGS. 8 to 10).

The charge pump CP may increase a charge supply amount according to the second up signal output from the multiplexer MUX, or decrease the charge supply amount according to the second down signal output from the multiplexer MUX. According to this, subsequent operations of the loop filter LPF and the voltage controlled oscillator VCO are the same as described above.

Through such a series of processes, the phase of the clock signal CLK may be maintained during the active data period.

Figure 6:
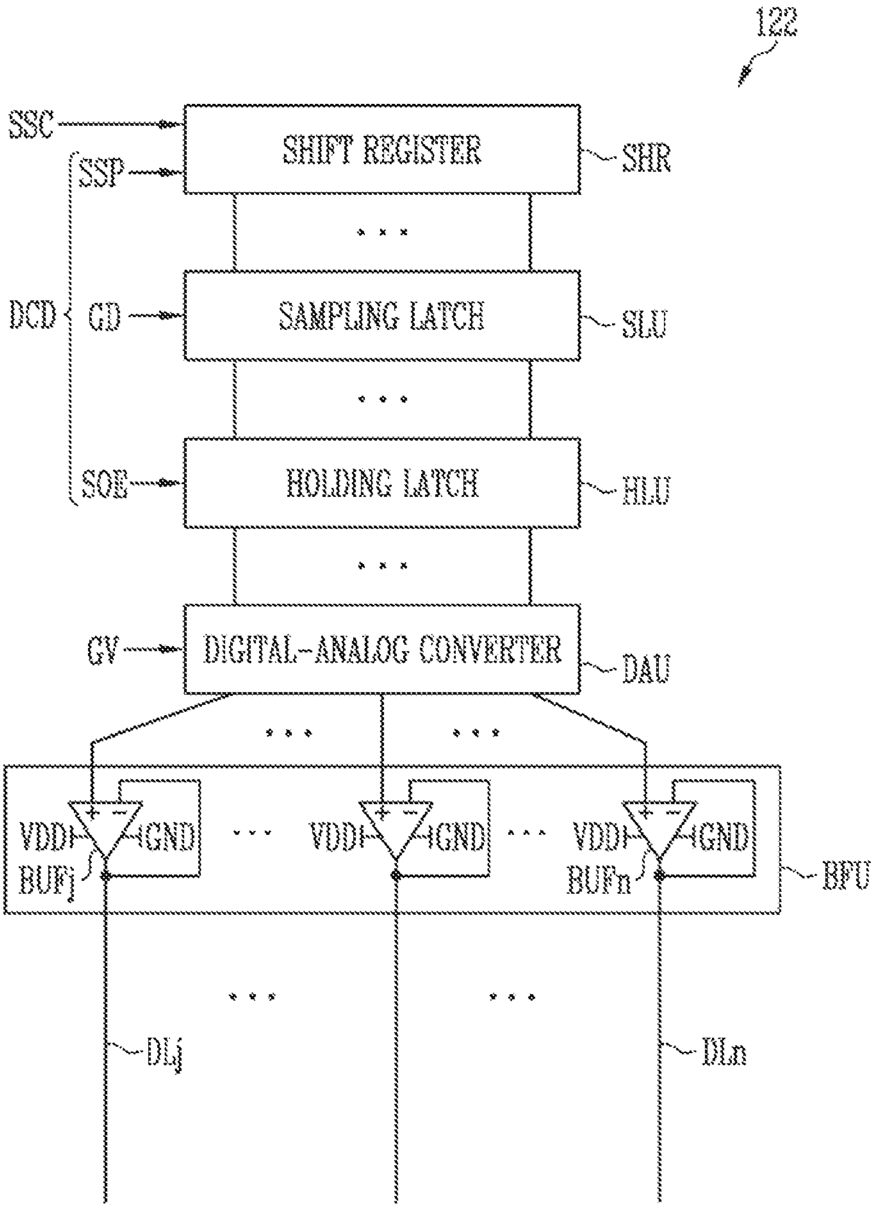
FIG. 6 is a diagram illustrating a data voltage generator in accordance with an embodiment of the present disclosure.

FIG. 6 is a diagram illustrating a data voltage generator in accordance with an embodiment of the present disclosure.

Referring to FIG. 6, the data voltage generator 122 in accordance with the embodiment of the present disclosure may include a shift register SHR, a sampling latch SLU, a holding latch HLU, a digital-analog converter DAU, and an output buffer BFU.

The data signal DCD received from the transceiver 121 may include a source start pulse SSP, grayscale values GD, a source output enable SOE, and the like.

The shift register SHR may sequentially generate sampling signals while shifting the source start pulse SSP for each one cycle of the source shift clock SSC. A number of the sampling signals may correspond to a number of the data lines DLj to DLn. For example, the number of the sampling signals may be equal to the number of the data lines DLj to DLn. In another example, when the display device 10 further includes a demultiplexer between the data driver 12 and the data lines DLj to DLn, the number of the sampling signals may be smaller than the number of the data lines DLj to DLn. Hereinafter, for convenience of description, a case where there exists no demultiplexer is assumed.

The sampling latch SLU may include sampling latch units of which number corresponds to the number of the data lines DLj to DLn, and sequentially receive grayscale values GD for an image frame from the timing controller 11. The sampling latch SLU may store sampling latches corresponding to the grayscale values GD sequentially received from the timing controller 11 in response to the sampling signals sequentially supplied from the shift register SHR.

The holding latch HLU may include holding latch units of which number corresponds to the number of the data lines DLj to DLn. When the source output enable SOE is input to the holding latch unit HLU, the holding latch unit HLU may store, in the holding latch units, the grayscale values GD stored in the sampling latch units.

The digital-analog converter ADU may include digital-analog conversion units of which number corresponds to the number of the data lines DLj to DLn. For example, the number of the digital-analog conversion units may be equal to the number of the data lines DLj to DLn. Each of the digital-analog conversion units may apply, to a corresponding data line, a grayscale voltage GV corresponding to a grayscale value GD stored in a corresponding holding latch.

The grayscale voltage GV may be provided from a grayscale voltage generator. The grayscale voltage generator may include a red grayscale voltage generator, a green grayscale voltage generator, and a blue grayscale voltage generator. The grayscale voltage GV may be set such that a luminance corresponding to each grayscale follows a gamma curve.

The output buffer BFU may include buffer units BUFj to BUFn. Each of the buffer units BUFj to BUFn may be an operational amplifier. Each of the buffer units BUFj to BUFn may be configured in the form of a voltage follower, to apply an output of a corresponding digital-analog conversion unit to a corresponding data line of the data lines DLj to DLn. For example, an inverting terminal of each of the buffer units BUFj to BUFn may be connected to an output terminal thereof, and a non-inverting terminal of each of the buffer units BUFj to BUFn may be connected to an output terminal of a corresponding digital-analog conversion unit. Outputs of the buffer units BUFj to BUFn may be data voltages.

For example, an output terminal of a jth buffer unit BUFj may be connected to the jth data line DLj, and receive a buffer power voltage VDD and a ground power voltage GND. The buffer power voltage VDD may determine an upper limit of an output voltage (e.g., a data voltage) of the buffer unit BUFj. In addition, the ground power voltage GND may determine a lower limit of the output voltage of the buffer unit BUFj. The buffer unit BUFj may be further applied with other voltages instead of the buffer power voltage VDD and the ground power voltage GND according to a configuration thereof. The other voltages may be control voltages for determining a slew rate of the buffer unit BUFj. The control voltages are different from the buffer power voltage VDD, in that the control voltages are not voltages for determining the upper limit or the lower limit of the output voltage of the buffer unit BUFj, for example.

FIGS. 7 to 10 are diagrams illustrating an example of signals provided from the timing controller.

Figure 7:
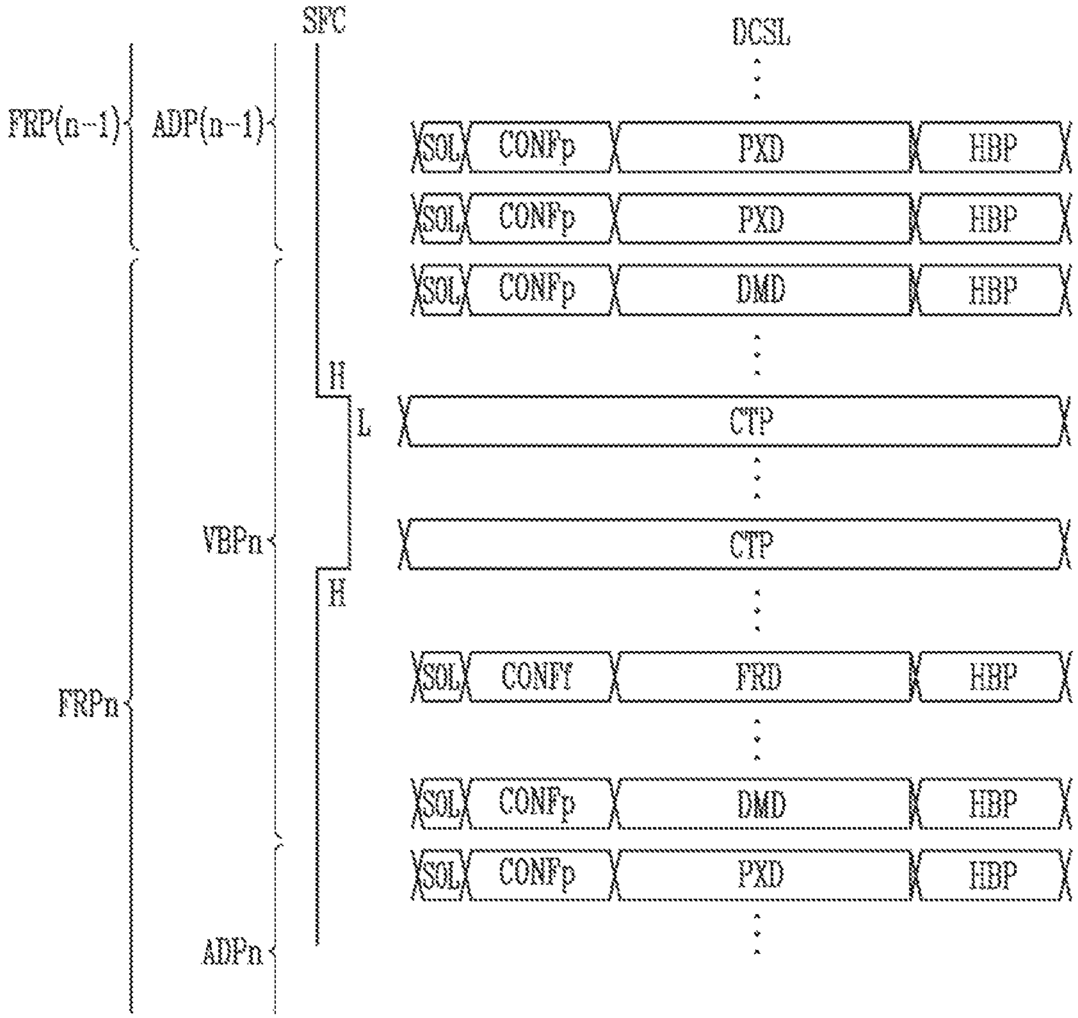
FIGS. 7, 8, 9 and 10 are diagrams illustrating an example of signals provided from a timing controller.

Referring to FIG. 7, a frame period of each image frame may include a vertical blank period and an active data period. For example, an nth frame period FRPn may include an nth vertical blank period VBPn and an nth active data period ADPn. An n−1th frame period FRP(n−1) may include an n−1th active data period ADP(n−1).

Active data periods ADP(n−1) and ADPn may correspond to a supply period of grayscale values constituting an image frame to be displayed by the pixel unit 14. The grayscale values may be included in pixel data PXD.

The nth vertical blank period VBPn may be located between the n−1th active data period ADP(n−1) of a previous frame and the nth active data period ADPn of a current frame. Clock training, frame configuration, and dummy data supply may be performed during the vertical blank period VBPn. The vertical blank period VBPn may sequentially include a supply period of dummy data DMD, a supply period of clock training patterns CTP, a supply period of frame data FRD, and a supply period of dummy data DMD.

When the timing controller 11 provides a clock training signal having a first logic level (e.g., a logic low level) to the clock training line SFC, the timing controller 11 may provide a clock training pattern CTP to the clock data line DCSL. When the timing controller 11 provides the clock training signal having a second logic level (e.g., a logic high level) to the clock training line SFC, the timing controller 11 may provide a clock data signal instead of the clock training pattern CTP to the clock data line DCSL.

For example, the timing controller 11 may notify the data driver 12 that the clock training signal having a low logic level L is applied to the clock training line SFC during the vertical blank period VBPn, so that a clock training pattern CTP is supplied to the clock data line DCSL. When the clock training pattern CTP is not supplied, the timing controller 11 may apply the clock training signal having a high logic level H to the clock training line SFC. However, logic levels of the clock training signal may be differently set according to system specifications.

The timing controller 11 may provide a first configuration signal CONFf for a next clock training pattern during a period in which the clock training signal having a second logic level (e.g., a logic high level) is provided. The first configuration signal CONFf will be described with reference to FIG. 10.

Figure 8:
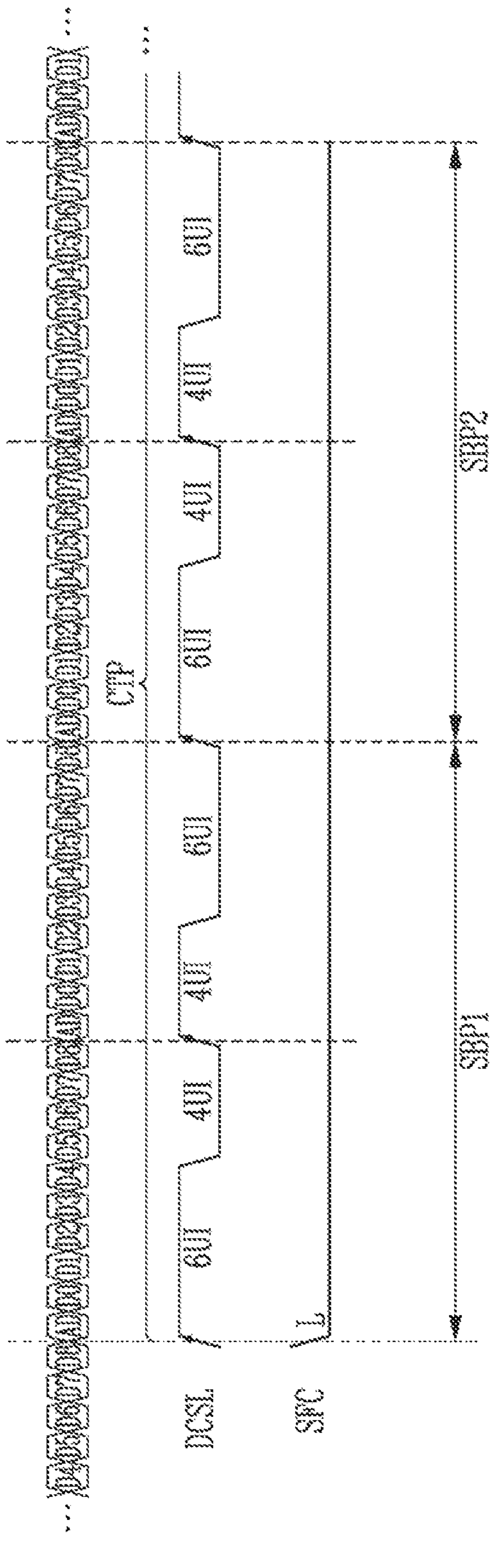

Referring to FIG. 8, an example clock training pattern CTP is illustrated. For example, the clock training pattern CTP may include a plurality of sub-patterns SBP1, SBP2, . . . . Each of the sub-patterns SBP1, SBP2, . . . may include at least two unit data.

For example, each unit data may be configured with 10 bits (AD, D0, D1, D2, D3, D4, D5, D6, D7, and D8). A period in which one bit is supplied to the clock data line DCSL may be 1 unit interval (UI). Unit data may have the same time length. For example, in this embodiment, each unit data may be configured with 10 UI. Each unit data includes a transition bit AD. For example, an initial bit of the unit data may be the transition bit AD. Although the transition bit AD is differently set according to certain products, the transition bit AD may be set to have a logic level different from a logic level of a previous bit. The previous bit may be the bit that immediately precedes the transition bit AD. For example, the previous bit may be D8. According to certain products, the transition bit AD may be set to have a level different from a level of a next bit.

In the embodiment shown in FIG. 8, sub-patterns SBP1 and SBP2 are configured identically to each other. For example, each of the sub-patterns SBP1 and SBP2 includes a first unit data in which a ratio of a high level versus a low level is 6:4 and a second unit data in which a ratio of a high level versus a low level is 4:6. The clock training pattern CTP shown in FIG. 8 may be set differently, and embodiments of the clock training pattern CTP will be described in more detail with reference to drawings from FIG. 10.

Figure 9:
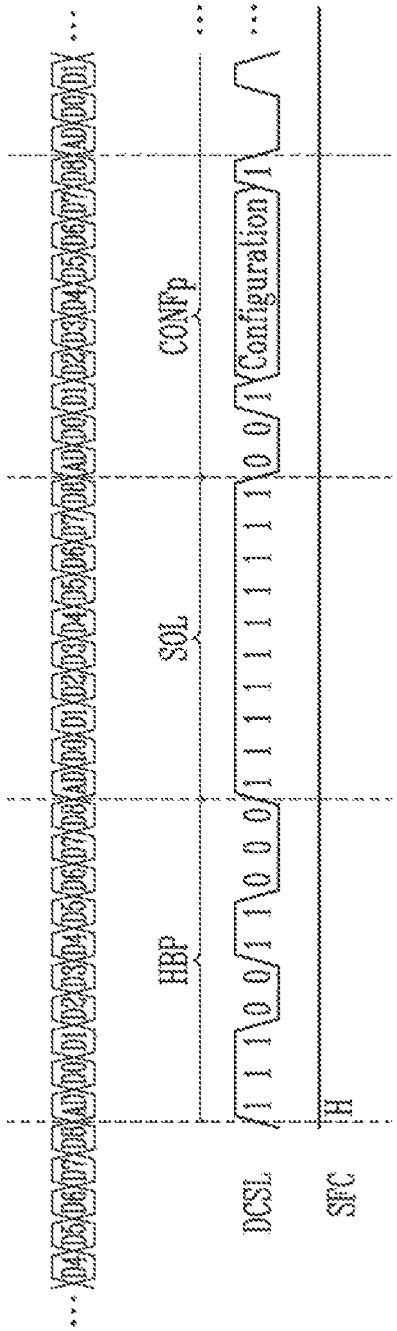

Referring to FIG. 9, example data control signals HBP, SOL, and CONFp are illustrated.

A horizontal blank period signal HBP may notify the driver unit 120 that a pixel row (e.g., pixels connected to the same scan line) corresponding to pixel data PXD is changed. Although the horizontal blank period signal HBP is configured with 1110011000 in this embodiment, this may vary according to certain products.

A start of line SOL may notify the driver unit 120 that supply of a signal for the changed pixel row is started. Although the start of line SOL is configured with 1111111111 in this embodiment, this may vary according to certain products.

A second configuration signal CONFp may include an operating option of the driver unit 120. For example, the second configuration signal CONFp may indicate that subsequent data is pixel data PXD or dummy data DMD.

The pixel data PXD may express a grayscale value of a pixel to which the other bits D0, D1, D2, D3, D4, D5, D6, D7, and D8 except the transition bit AD of the unit data correspond. The configuration of the pixel data PXD may vary according to certain products.

Figure 10:
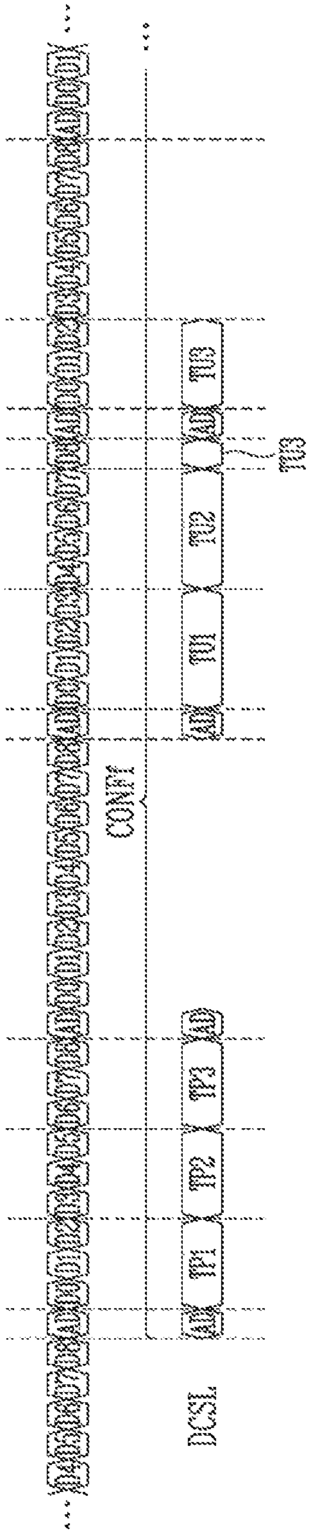

Referring to FIG. 10, the first configuration signal CONFf is illustrated as an example.

The first configuration signal CONFf may include an operating option of the driver unit 120. For example, the first configuration signal CONFf may indicate that subsequent data is frame data FRD.

In an embodiment of the present disclosure, the first configuration signal CONFf may include sub-pattern period setting values TP1, TP2, TP3, . . . . In addition, the first configuration signal CONFf may further include initial-level period setting values TU1, TU2, TU3, . . . . As described above, the first configuration signal CONFf may include information on a next clock training pattern. The next clock training pattern may be a clock training pattern of a next frame.

The sub-pattern period setting values TP1, TP2, TP3, . . . may indicate periods of respective patterns of the next clock training pattern. For example, a first sub-pattern period setting value TP1 may indicate a period of a first sub-pattern of the next clock training pattern, a second sub-pattern period setting value TP2 may indicate a period of a second sub-pattern of the next clock training pattern, and a third sub-pattern period setting value TP3 may indicate a period of a third sub-pattern of the next clock training pattern.

The initial-level period setting values TU1, TU2, TU3, . . . may indicate periods in which initial levels of the respective sub-patterns of the next clock training pattern are maintained. For example, a first initial-level period setting value TU1 may indicate a period in which an initial level of the first sub-pattern of the next clock training pattern is maintained, a second initial-level period setting value TU2 may indicate a period in which an initial level of the second sub-pattern of the next clock training pattern is maintained, and a third initial-level period setting value TU3 may indicate a period in which an initial level of the third sub-pattern of the next clock training pattern is maintained.

Referring to FIG. 10, an example in which each of the sub-pattern period setting values TP1, TP2, TP3, . . . is configured with three bits (or 3 UI) is illustrated. In addition, an example in which each of the initial-level period setting values TU1, TU2, TU3, . . . is configured with four bits (e.g., 4 UI) is illustrated. The third initial-level period setting value TU3 may be divided into bits before/after the transition bit AD, but there is no problem in data analysis.

In accordance with this embodiment, configuration information on the next clock training pattern is provided in advance, so that the locking time of the clock signal CLK can be decreased. For example, the lock detector LFD can identify, in advance, when transition of the clock training pattern occurs, and thus the clock training pattern and the clock signal CLK are compared with each other at a transition time of the clock training pattern, so that whether the clock signal CLK has been locked can be rapidly detected (see FIG. 5).

FIG. 11 is a diagram illustrating sub-pattern period setting values of the first configuration signal in accordance with an embodiment of the present disclosure.

The sub-pattern period setting values TP[2:0] may indicate a number of unit data which a corresponding sub-pattern includes. For example, 1T shown in FIG. 11 may mean that the number of unit data is 1. For example, 2T may mean that the number of unit data is 2, 3T may mean that the number of unit data is 3, and so forth.

As described above, one unit data may be configured with 10 UI. For example, when a sub-pattern period setting value TP[2:0] is configured with three bits, a sub-pattern period setting value TP[2:0] as 000 may indicate that a period of a corresponding sub-pattern is 20 UI, a sub-pattern period setting value TP[2:0] as 001 may indicate that a period of the corresponding sub-pattern is 30 UI, a sub-pattern period setting value TP[2:0] as 010 may indicate that a period of the corresponding sub-pattern is 40 UI, a sub-pattern period setting value TP[2:0] as 011 may indicate that a period of the corresponding sub-pattern is 50 UI, a sub-pattern period setting value TP[2:0] as 100 may indicate that a period of the corresponding sub-pattern is 60 UI, a sub-pattern period setting value TP[2:0] as 101 may indicate that a period of the corresponding sub-pattern is 70 UI, a sub-pattern period setting value TP[2:0] as 110 may indicate that a period of the corresponding sub-pattern is 80 UI, and a sub-pattern period setting value TP[2:0] as 111 may indicate that a period of the corresponding sub-pattern is 90 UI.

FIG. 12 is a diagram illustrating initial-level period setting values of the first configuration signal in accordance with an embodiment of the present disclosure.

For example, when an initial-level period setting value TU[3:0] is configured with four bits, an initial-level period setting value TU[3:0] as 0000 may indicate that a period in which an initial level of a corresponding sub-pattern is maintained is 1 UI, an initial-level period setting value TU[3:0] as 0001 may indicate that a period in which the initial level of the corresponding sub-pattern is maintained is 2 UI, an initial-level period setting value TU[3:0] as 0010 may indicate that a period in which the initial level of the corresponding sub-pattern is maintained is 3 UI, an initial-level period setting value TU[3:0] as 0011 may indicate that a period in which the initial level of the corresponding sub-pattern is maintained is 4 UI, an initial-level period setting value TU[3:0] as 0100 may indicate that a period in which the initial level of the corresponding sub-pattern is maintained is 5 UI, an initial-level period setting value TU[3:0] as 0101 may indicate that a period in which the initial level of the corresponding sub-pattern is maintained is 6 UI, an initial-level period setting value TU[3:0] as 0110 may indicate that a period in which the initial level of the corresponding sub-pattern is maintained is 7 UI, an initial-level period setting value TU[3:0] as 0111 may indicate that a period in which the initial level of the corresponding sub-pattern is maintained is 8 UI, and an initial-level period setting value TU[3:0] as 1000 may indicate that a period in which the initial level of the corresponding sub-pattern is maintained is 9 UI.

Figure 13:
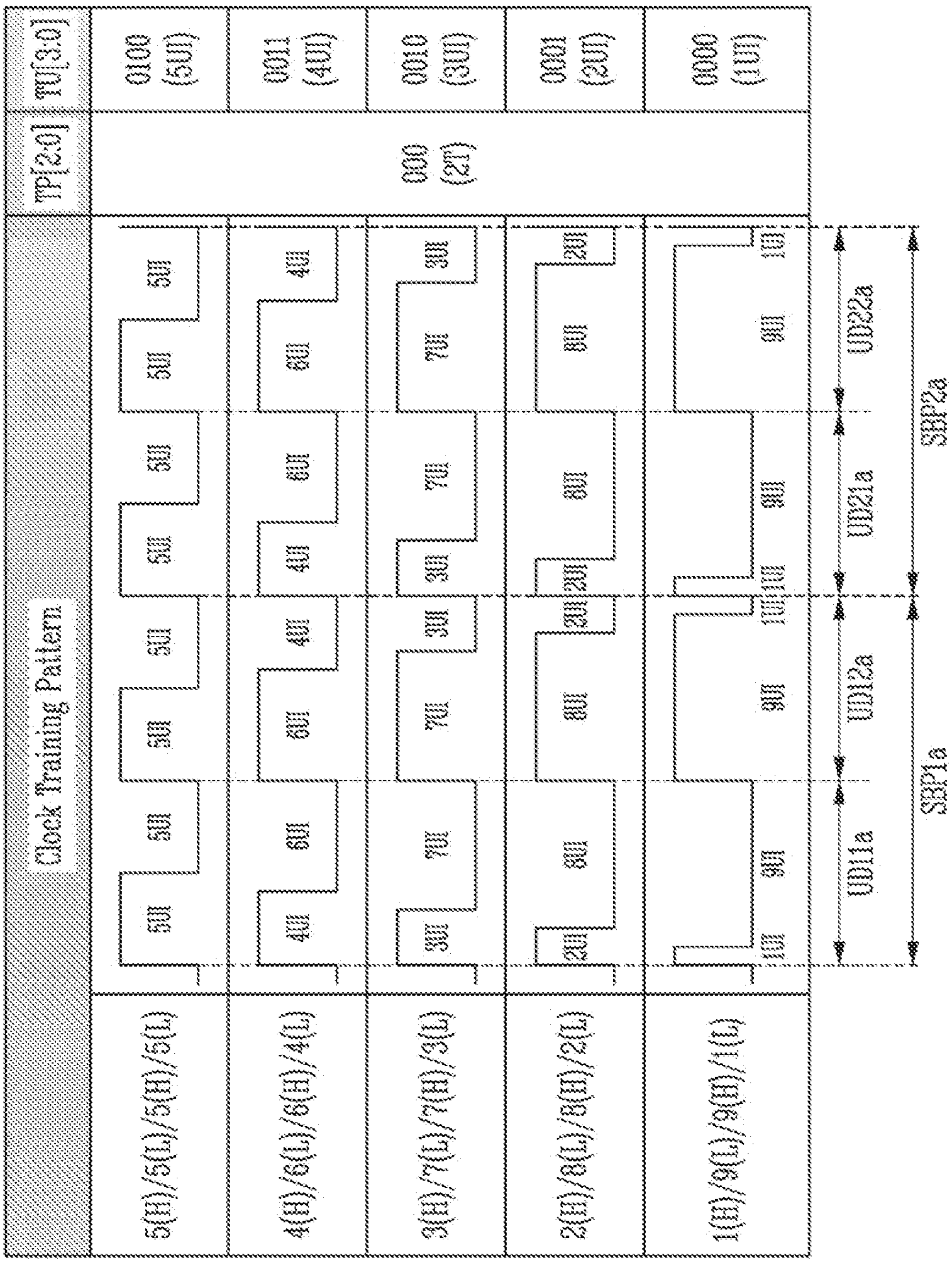
FIGS. 13, 14 and 15 are diagrams illustrating clock training patterns according to the first configuration signal.
Figure 14:
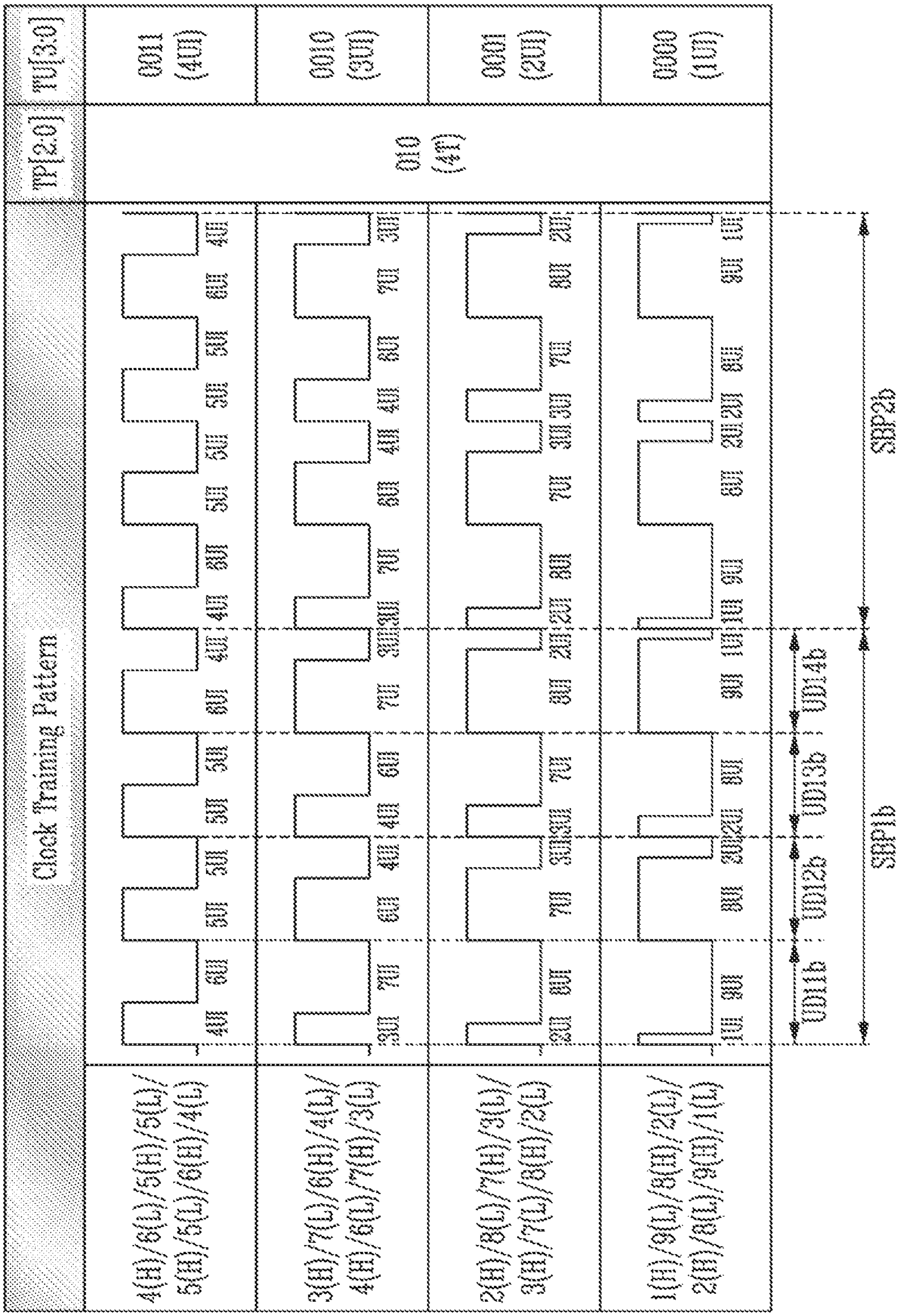
Figure 15:
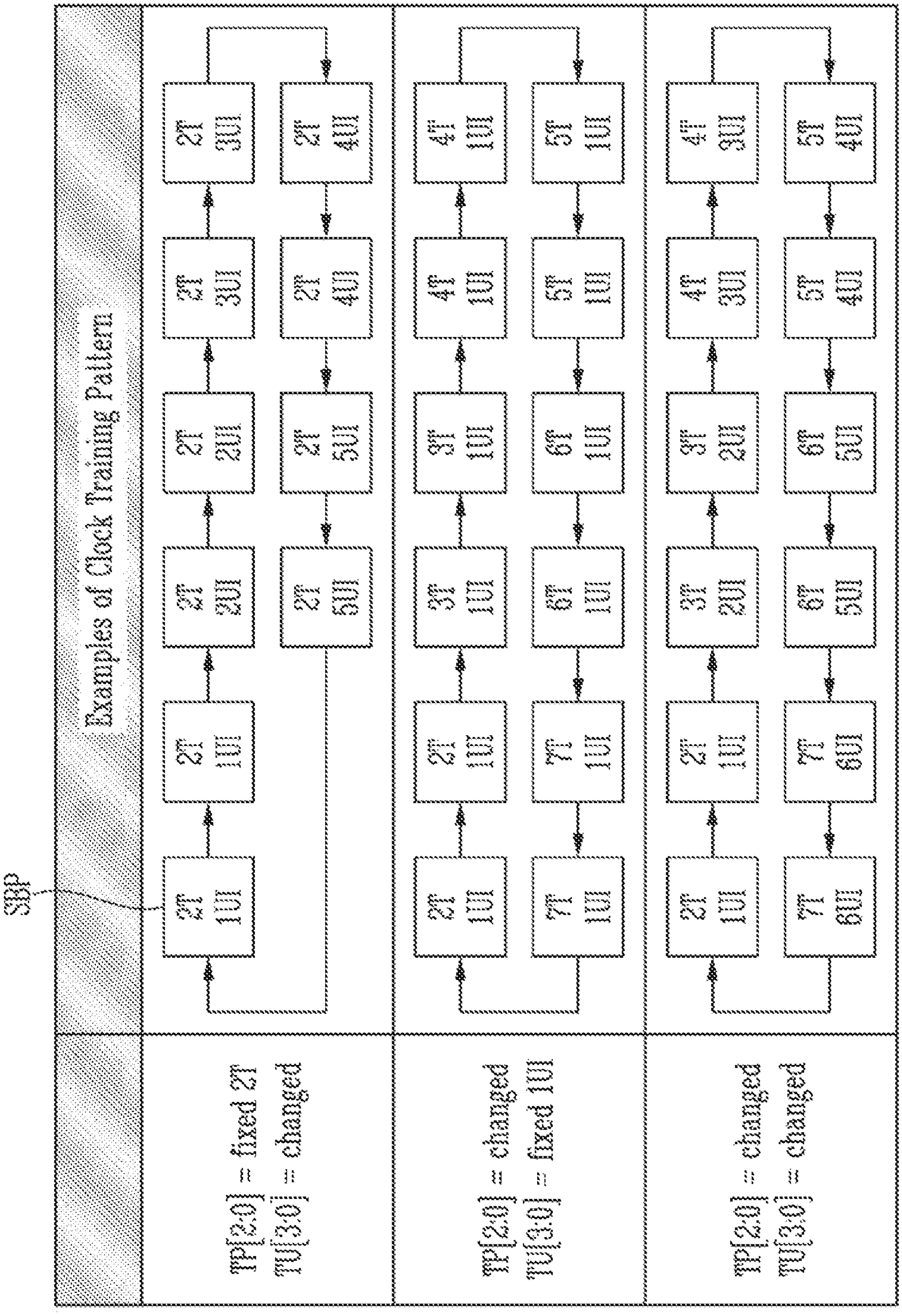

FIGS. 13 to 15 are diagrams illustrating clock training patterns according to the first configuration signal.

Referring to FIG. 13, a case where each of sub-pattern period setting values TP[2:0] of a first sub-pattern SBP1*a* and a second sub-pattern SBP2 is set as 000 is illustrated. In addition, a case where initial-level period setting values TU[3:0] of the first sub-pattern SBP1*a* and the second sub-pattern SBP2 are respectively set as 0100, 0011, 0010, 0001, and 0000 is illustrated. Referring to FIGS. 11 and 12, data indicated by the sub-pattern period setting values TP[2:0] and the initial-level period setting values TU[3:0] can be identified.

Each of the first and second sub-patterns SBP1*a* and SBP2*a* may include at least two unit data. For example, the first sub-pattern SBP1*a* may include two unit data UD11*a* and UD12*a*, and the second sub-pattern SBP2*a* may include two unit data UD21*a* and UD22*a*. The unit data UD11*a*, UD12*a*, UD21*a*, and UD22*a* may have the same time length (10 UI). An initial bit of each of the unit data UD11*a*, UD12*a*, UD21*a*, and UD22*a* may be a transition bit having a logic level different from a logic level of a previous bit. Each of the unit data UD11*a*, UD12*a*, UD21*a*, and UD22*a* constituting the first and second sub-patterns SBP1*a* and SBP2*a* may maintain a third logic level (e.g., a logic high level) during a first period, and maintain a fourth logic level (e.g., a logic low level) during a second period.

The initial-level period setting values TU[3:0] may indicate a period in which the third logic level (e.g., the logic high level) of first unit data of a corresponding sub-pattern is maintained. For example, a first initial-level period setting value TU[3:0] may indicate a period in which the third logic level (e.g., the logic high level) of first unit data UD11*a* of the first sub-pattern SBP1*a* is maintained. For example, the first initial-level period setting value TU[3:0] as 0100 may indicate that the first unit data UD11*a* of the first sub-pattern SBP1*a* is maintained for 5 UI. As another example, the first initial-level period setting value TU[3:0] as 0011 may indicate that the first unit data UD11*a* of the first sub-pattern SBP1*a* is maintained for 4 UI. A second initial-level setting value TU[3:0] may indicate a period in which the third logic level (e.g., the logic high level) of first unit data UD21*a* of the second sub-pattern SBP2*a* is maintained. For example, the second initial-level period setting value TU[3:0] as 0100 may indicate that the first unit data UD21*a* of the second sub-pattern SBP2*a* is maintained for 5 UI. As another example, the second initial-level period setting value TU[3:0] as 0011 may indicate that the first unit data UD21*a* of the second sub-pattern SBP2*a* is maintained for 4 UI.

In an embodiment, a length of a first period of second unit data UD12*a* (e.g., 9 UI) of the first sub-pattern SBP1*a* may be equal to a length of a second period of the first unit data UD11*a* (e.g., 9 UI). In addition, a length of a second period of the second unit data UD12*a* (e.g., 1 UI) of the first sub-pattern SBP1*a* may be equal to a length of a first period of the first unit data UD11*a* (e.g., 1 UI). The same description may be applied to the second sub-pattern SBP2*a*.

Referring to FIG. 14, a case where each of sub-pattern period setting values TP[2:0] of a first sub-pattern SBP1*b* and a second sub-pattern SBP2*b* is set as 010 is illustrated. In addition, Initial-level period setting values TU[3:0] of the first sub-pattern SBP1*b* and the second sub-pattern SBP2*b* are respectively set as 0011, 0010, 0001, and 0000. Referring to FIGS. 11 and 12, data indicated by the sub-pattern period setting values TP[2:0] and the initial-level period setting values TU[3:0] can be identified.

Each of the sub-patterns SBP1*b* and SBP2*b* may include at least two unit data. For example, the first sub-pattern SBP1*b* may include four unit data UD11*b*, UD12*b*, UD13*b*, and UD14*b*.

In an embodiment of the present disclosure, a length of a first period of second unit data UD12*b* of the first sub-pattern SBP1*b* may be shorter by 1 UI than a length of a second period of first unit data UD11*b*. For example, the length of the first period of second unit data UD12*b*, which is 8 UI, is less than the length of the second period of first unit data UD11*b*, which is 9 UI, by 1 UI. A length of a first period of third unit data UD13*b* of the first sub-pattern SBP1*b* may be equal to a length of a second period of the second unit data UD12*b*. A length of a first period of fourth unit data UD14*b* of the first sub-pattern SBP1*b* may be longer by 1 UI than a length of a second period of the third unit data UD13*b*.

Descriptions of the other components shown in FIG. 14 are identical to the descriptions shown in FIG. 13, and therefore, overlapping descriptions will be omitted.

Referring to FIG. 15, when the sub-pattern period setting values TP[2:0] and the initial-level period setting values TU[3:0] are variously set, it can be seen that various clock training patterns including various sub-patterns SBP can be transmitted.

In an embodiment of the present disclosure, a clock training pattern may have a cycle in which the sub-pattern period setting values TP[2:0] are fixed (e.g., 2T), and the initial-level period setting values TU[3:0] are sequentially increased (e.g., 1 UI, 2 UI, 3 UI, 4 UI, and 5 UI).

In another embodiment of the present disclosure, a clock training pattern may have a cycle in which the sub-pattern period setting values TP[2:0] are sequentially increased (e.g., 2T, 3T, 4T, 5T, 6T, and 7T), and the initial-level period setting values TU[3:0] are fixed (e.g., 1 UI).

In still another embodiment of the present disclosure, a clock training pattern may have a cycle in which the sub-pattern period setting values TP[2:0] are sequentially increased (e.g., 2T, 3T, 4T, 5T, 6T, and 7T), and the initial-level period setting values TU[3:0] are sequentially increased (e.g., 1 UI, 2 UI, 3 UI, 4 UI, 5 UI, and 6 UI).

In accordance with this embodiment, in the display device and the driving method thereof, various clock training patterns are transmitted, so that ISI jitter, a noise concentration phenomenon, or the like can be coped with. In other words, negative effects of ISI jitter, noise concentration phenomenon, or the like can be reduced by the display device and driving method thereof according to embodiments of the present disclosure.

Figure 16:
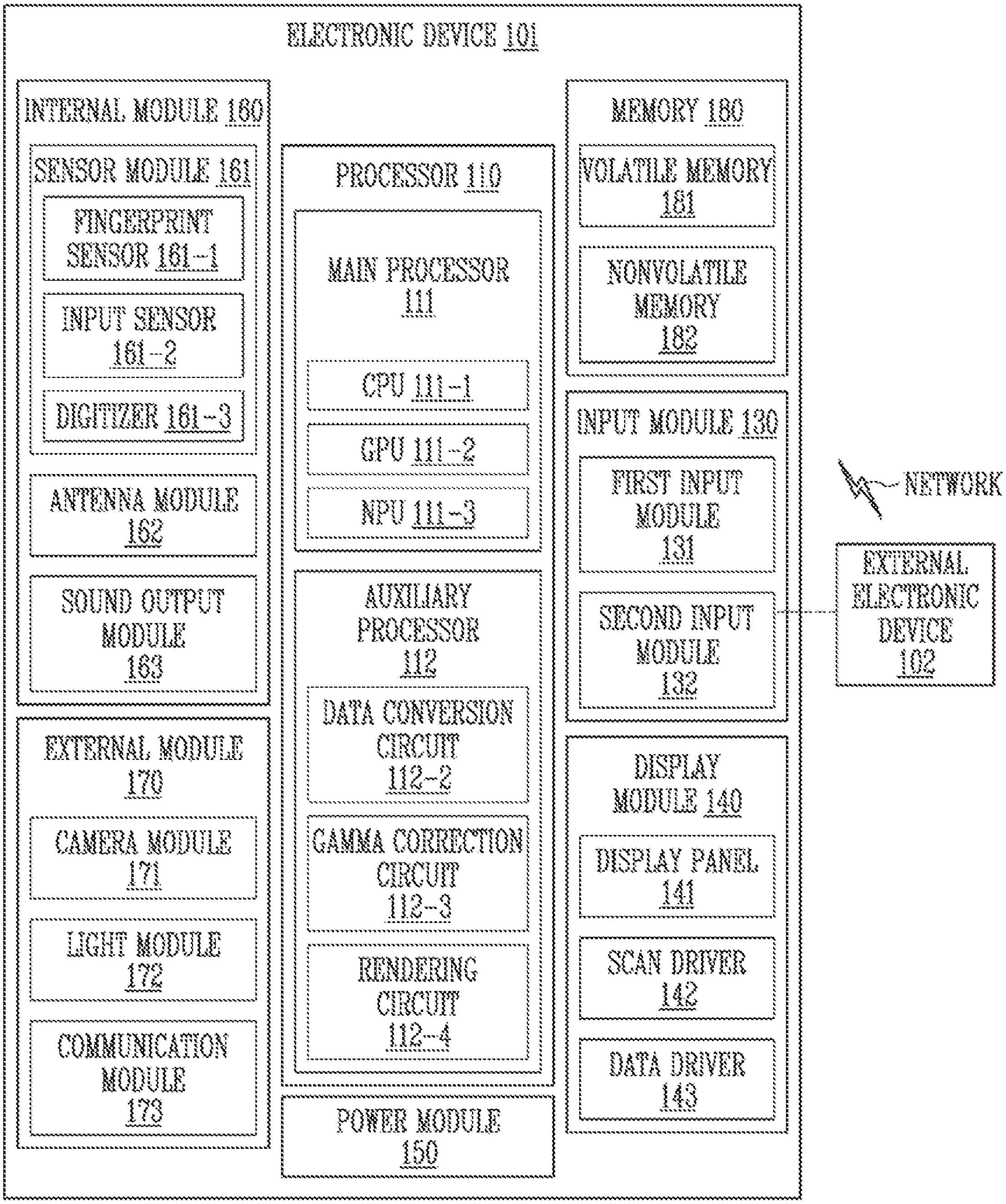
FIG. 16 is a block diagram of an electronic device in accordance with embodiments of the present disclosure.

FIG. 16 is a block diagram of an electronic device 101 in accordance with embodiments of the present disclosure.

The electronic device 101 outputs various information through a display module 140 in an operating system. When a processor 110 executes an application stored in a memory 180, the display module 140 provides application Information to a user through a display panel 141.

The processor 110 acquires an external input through an input module 130 or a sensor module 161, and executes an application corresponding to the external input. For example, when the user selects a camera icon displayed through the display panel 141, the processor 110 acquires a user input through an input sensor 161-2, and activates a camera module 171. The processor 110 transfers, to the display module 140, image data corresponding to a photographed image acquired through the camera module 171. The display module 140 may display an image corresponding to the photographed image through the display panel 141.

In another example, when personal information authentication is executed in the display module 140, a fingerprint sensor 161-1 acquires input fingerprint information as input data. The processor 110 compares the input data acquired through the fingerprint sensor 161-1 with authentication data stored in the memory 180, and executes an application according to a comparison result. The display module 140 may display information executed according to a logic of the application through the display panel 141.

In still another example, when a music streaming icon displayed through the display module 140 is selected, the processor 110 acquires a user input through the input sensor 161-2, and activates a music streaming application stored in the memory 180. When a music execution command is input in the music streaming application, the processor 110 activates a sound output module 163, thereby providing the user with sound information corresponding to the music execution command.

In the above, an operation of the electronic device 101 has been briefly described. Hereinafter, a configuration of the electronic device 101 will be described in detail. Some of components of the electronic device 101, which will be described later, may be integrated to be provided as one component, and one component may be divided into two or more components to be provided.

Referring to FIG. 16, the electronic device 101 may communicate with an external electronic device 102 through a network (e.g., a short-range wireless communication network or a long-range wireless communication network). In accordance with an embodiment of the present disclosure, the electronic device 101 may include the processor 110, the memory 180, the input module 130, the display module 140, a power module 150, an internal module 160, and an external module 170. In accordance with an embodiment of the present disclosure, in the electronic device 101, at least one of the above-described components may be omitted, or at least another component may be added. In accordance with an embodiment of the present disclosure, some components (e.g., the sensor module 161, an antenna module 162, or the sound output module 163) among the above-described components may be integrated in another component (e.g., the display module 140).

The processor 110 may control at least another component (e.g., a component of hardware or software) of the electronic device 101, which is connected to the processor 110, by executing software, and perform various data processing or calculations. In accordance with an embodiment of the present disclosure, as at least a portion of data processing or calculation, the processor 110 may store command or data, received from another component (e.g., the input module 130, the sensor module 161, or a communication module 173), in a volatile memory 181, and process a command or data, stored in the volatile memory 181. Result data may be stored in a nonvolatile memory 182.

The processor 110 may include a main processor 111 and an auxiliary processor 112. The main processor 111 may include at least one of a central processing unit (CPU) 111-1 and an application processor (AP). The main processor 111 may further include at least one of a graphic processing unit (GPU) 111-2, a communication processor (CP), and an image signal processor (ISP). The main processor 111 may further include a neural processing unit (NPU) 111-3. The NPU 111-3 is a processor specialized in processing an artificial intelligence model, and the artificial intelligence model may be generated through machine learning. The artificial intelligence model may include a plurality of artificial neural network layers. An artificial neural network may be one of a deep neural network (DNN), a convolutional neural network (CNN), a recurrent neural network (RNN), a Recurrent Boltzmann Machine, a restricted Boltzmann machine (RBM), a deep belief network (DBN), a deep Q-Network, and any combination of at least two of the above-described networks, but the present disclosure is not limited to the above-described example. The artificial intelligence model may include additionally or substitutionally a software structure in addition to the hardware structure. At least two of the above-described processing units and the above-described processors may be implemented into one integrated component (e.g., a single chip). Alternatively, the at least two components may be implemented as independent components (e.g., a plurality of chips).

The auxiliary processor 112 may include a controller. The controller may include an interface conversion circuit and a timing control circuit. The controller receives an image signal from the main processor 111, and outputs image data by converting a data format of the image signal to be suitable for an interface specification with the display module 140. The controller may output various control signals used to drive the display module 140.

The auxiliary processor 112 may further include a data conversion circuit 112-2, a gamma correction circuit 112-3, a rendering circuit 112-4, and the like. The data conversion circuit 112-2 may receive image data from the controller, and compensate for the image data such that an image is displayed with a desired luminance according to a characteristic of the electronic device 101, a configuration of the user, or the like or convert the image data to achieve reduction of power consumption, afterimage compensation, or the like. The gamma correction circuit 112-3 may convert image data, a gamma reference voltage, or the like such that an image displayed in the electronic device 101 has a desired gamma characteristic. The rendering circuit 112-4 may receive image data from the controller, and render the image data by considering a pixel arrangement of the display panel 141, and the like, applied to the electronic device 101. At least one of the data conversion circuit 112-2, the gamma correction circuit 112-3, and the rendering circuit 112-4 may be integrated in another component (e.g., the main processor 111 or the controller). At least one of the data conversion circuit 112-2, the gamma correction circuit 112-3, and the rendering circuit 112-4 may be integrated in a data driver 143 which will be described later.

The memory 180 may store various data used by at least one component (e.g., the processor 110 or the sensor module 161), and input data or output data about a command associated therewith. The memory 180 may include at least one of the volatile memory 181 and the nonvolatile memory 182.

The input module 130 may receive a command or data to be used in a component (e.g., the processor 110, the sensor module 161) of the electronic device 101 from the outside (e.g., the user or the external electronic device 102) of the electronic device 101.

The input module 130 may include a first input module 131 to which a command or data is input from the user and a second input module 132 to which a command or data is input from the external electronic device 102. The first input module 131 may include a microphone, a mouse, a keyboard, a key (e.g., a button), or a pen (e.g., a passive pen or an active pen). The second input module 132 may support a specified protocol through which the second input module 132 can be connected to the external electronic device 102 by wired or wireless techniques. In accordance with an embodiment of the present disclosure, the second input module 132 may include a high definition multimedia interface (HDMI), a universal serial bus (USB) interface, a secure digital (SD) card interface, or an audio interface. The second input module 132 may include a connector capable of physically connecting the second input module 132 to the external electronic device 102, e.g., an HDMI connector, a USB connector, an SD card connector, or an audio connector (e.g., a headphone connector).

The display module 140 provides visual information to the user. The display module 140 may include the display panel 141, a scan driver 142, and the data driver 143. The display module 140 may further include a window, a chassis, and a bracket, which are used to protect the display panel 141.

The display panel 141 may include a liquid crystal display panel, an organic light emitting display panel, or an inorganic light emitting display panel, and the kind of the display panel 141 is not particularly limited. The display panel 141 may be of a rigid type, be of a rollable type in which rolling is possible, or be of a flexible type in which folding is possible. The display module 140 may further include a supporter for supporting the display panel 141, a bracket, a head dissipation member, or the like.

The scan driver 142 is a driving chip, and may be mounted in the display panel 141. In addition, the scan driver 142 may be integrated in the display panel 141. For example, the scan driver 142 may include an amorphous silicon thin film transistor (TFT) gate (ASG) driver circuit, a low temperature polycrystalline silicon (LTPS) TFT gate driver circuit, or an oxide semiconductor TFT gate (OSG) driver circuit, which is embedded in the display panel 141. The scan driver 142 receives a control signal from the controller, and outputs scan signals to the display panel 141 in response to the control signal.

The display panel 141 may further include an emission driver. The emission driver outputs an emission control signal to the display panel 141 in response to the control signal received from the controller. The emission driver may be formed to be distinguished from the scan driver 142, or be integrated in the scan driver 142.

The data driver 143 receives a control signal from the controller, and converts image data into an analog voltage (e.g., a data voltage) and then outputs data voltages to the display panel 141 in response to the control signal.

The data driver 143 may be integrated in another component (e.g., the controller). Functions of the interface conversion circuit and the timing control circuit of the above-described controller may be integrated in the data driver 143.

The display module 140 may further include an emission driver, a voltage generating circuit, and the like. The voltage generating circuit may output various voltages used to drive the display panel 141.

The power module 150 supplies power to components of the electronic device 101. The power module 150 may include a battery for charging a power voltage. The battery may include a primary battery in which recharging is impossible, a secondary battery in which recharging is possible, or a fuel cell. The power module 150 may include a power management integrated circuit (PMIC). The PMIC supplies power optimized for each of the above-described modules and modules which will be described later. The power module 150 may include a wireless power transmitting/receiving member electrically connected to the battery. The wireless power transmitting/receiving member may include a plurality of coil-shaped antenna radiators.

The electronic device 101 may further include the internal module 160 and the external module 170. The internal module 160 may include the sensor module 161, the antenna module 162, and the sound output module 163. The external module 170 may include the camera module 171, a light module 172, and the communication module 173.

The sensor module 161 may sense an input caused by a body of the user or an input caused by a pen as the first input module 131, and generate an electrical signal or a data value, which corresponds to the input. The sensor module 161 may include at least one of the fingerprint sensor 161-1, the input sensor 161-2, and a digitizer 161-3.

The fingerprint sensor 161-1 may generate a data value corresponding to a fingerprint of the user. The fingerprint sensor 161-1 may include any one of an optical type fingerprint sensor or a capacitance type fingerprint sensor.

The input sensor 161-2 may generate a data value corresponding to coordinate information of the input caused by the body of the user or the input by the pen. The input sensor 161-2 generates, as a data value, a capacitance variation caused by an input. The input sensor 161-2 may sense an input caused by a passive pen, or transmit/receive data to/from an active pen.

The input sensor 161-2 may also measure a biometric signal such as blood pressure, moisture, or body fat. For example, when the user does not move for a certain time while allowing a body part to be in contact with a sensor layer or a sensing panel, the input sensor 161-2 may output information which the user desires by sensing a biometric signal, based on an electric field change caused by the body part.

The digitizer 161-3 may generate a data value corresponding to the coordinate information of the input caused by the pen. The digitizer 161-3 generates, as a data value, an electric field variation caused by an input. The digitizer 161-3 may sense an input caused by a passive pen, or transmit/receive data to/from an active pen.

At least one of the fingerprint sensor 161-1, the input sensor 161-2, and the digitizer 161-3 may be implemented with a sensor layer formed on the display panel 141 through a continuous process. The fingerprint sensor 161-1, the input sensor 161-2, and the digitizer 161-3 may be disposed on the top of the display panel 141, and any one, e.g., the digitizer 161-3, of the fingerprint sensor 161-1, the input sensor 161-2, and the digitizer 161-3 may be disposed on the bottom of the display panel 141.

At least two of the fingerprint sensor 161-1, the input sensor 161-2, and the digitizer 161-3 may be formed to be integrated into one sensing panel through the same process. When at least two of the fingerprint sensor 161-1, the input sensor 161-2, and the digitizer 161-3 are integrated into one sensing panel, the sensing panel may be disposed between the display panel 141 and the window disposed on the top of the display panel 141. In accordance with an embodiment of the present disclosure, the sensing panel may be disposed on the window, and the position of the sensing panel is not particularly limited.

At least one of the fingerprint sensor 161-1, the input sensor 161-2, and the digitizer 161-3 may be built in the display panel 141. In other words, at least one of the fingerprint sensor 161-1, the input sensor 161-2, and the digitizer 161-3 may be simultaneously formed through a process of forming elements (e.g., a light emitting element, a transistor, and the like) included in the display panel 141.

In addition, the sensor module 161 may generate an electrical signal or a data value, which corresponds to an internal state or an external state of the electronic device 101. The sensor module 161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The antenna module 162 may include one or more antennas for transmitting a signal or power to the outside or receiving a signal or power from the outside. In accordance with an embodiment of the present disclosure, the communication module 173 may transmit or receive a signal to or from the external electronic device through an antenna suitable for a communication scheme. An antenna pattern of the antenna module 162 may be integrated in one configuration (e.g., the display panel 141) of the display module 140, the input sensor 161-2, or the like.

The sound output module 163 is a device for outputting a sound signal to the outside of the electronic device 101, and may include, for example, a speaker used for a general purpose such as multimedia replay or recording replay and a receiver used for only phone reception. In accordance with an embodiment of the present disclosure, the receiver may be formed integrally with or separately from the speaker. A sound output pattern of the sound output module 163 may be integrated in the display module 140.

The camera module 171 may photograph a still image and a moving image. In accordance with an embodiment of the present disclosure, the camera module 171 may include at least one lens, an image sensor, or an image signal processor. The camera module 171 may further include an infrared camera capable of measuring existence of the user, a position of the user, eyes of the user, or the like.

The light module 172 may provide light. The light module 172 may include a light emitting diode or a xenon lamp. The light module 172 may be operated in interlock with the camera module 171 or be operated independently from the camera module 171.

The communication module 173 may support establishment of a wired or wireless communication channel between the electronic device 101 and the external electronic device 102 and communication performance through the established communication channel. The communication module 173 may include any one of a wireless communication module such as a cellular communication module, a short-range wireless communication module, or global navigation satellite system (GNSS) communication module and a wired communication module such as a local area network (LAN) communication module or a power line communication module, or include both the wireless communication module and the wired communication module. The communication module 173 may communicate with the external electronic device 102 through a short-range communication network such as Bluetooth, WiFi direct, or infrared data association (IrDA) or a long-range communication network such as a cellular network, Internet, or a computer network (e.g., a local area network (LAN) or a wide area network (WAN)). The above-described several kinds of communication modules may be implemented into one chip, or each of the communication modules may be implemented as a separate chip.

The input module 130, the sensor module 161, the camera module 171, and the like may be used to control an operation of the display module 140 in interlock with the processor 10.

The processor 110 outputs a command or data to the display module 140, the sound output module 163, the camera module 171, or the light module 172, based on input data received from the input module 130. For example, the processor 110 may generate image data, corresponding to input data applied through a mouse, an active pen, or the like, and output the image data to the display module 140. Alternatively, the processor 110 may generate command data, corresponding to the input data, and output the command data to the camera module 171 or the light module 172. When any input data is not received for a certain time from the input module 130, the processor 110 may change an operation mode of the electronic device 101 to a low power mode or a sleep mode, thereby reducing power consumed by the electronic device 101.

The processor 110 outputs a command or data to the display module 140, the sound output module 163, the camera module 171, or the light module 172, based on sensing data received from the sensor module 161. For example, the processor 110 may compare authentication data applied by the fingerprint sensor 161-1 with authentication data stored in the memory 180, and then execute an application according to a comparison result. Based on sensing data sensed by the input sensor 161-2 or the digitizer 161-3, the processor 110 may execute a command or output the corresponding image data to the display module 140. When a temperature sensor is included in the sensor module 161, the processor may receive temperature data about a temperature measured from the sensor module 161, and further perform luminance correction of image data, or the like, based on the temperature data.

The processor 110 may receive, from the camera module 171, measurement data about existence of the user, a position of the user, eyes of the user, or the like. The processor 110 may further perform luminance correction of image data, based on the measurement data. For example, the processor 110 which determines the existence of the user through an input from the camera module 171 may output image data of which luminance is corrected to the display module 140 through the data conversion circuit 112-2 or the gamma correction circuit 112-3.

Some components among the components may be connected to each other through a communication scheme between peripheral devices, e.g., a bus, a general purpose input/output (GPIO), a serial peripheral interface (SPI), a mobile industry processor interface (MIPI), or an ultra path interconnect (UPI) link, to exchange a signal (e.g., a command or data) with each other. The processor 110 may communicate with the display module 140 through an engaged interface. For example, the processor 110 may use any one of the above-described communication schemes. However, the present disclosure is not limited to the above-described communication schemes.

The electronic device 101 in accordance with various embodiments disclosed in this specification may be various types of devices. For example, the electronic device 101 may include at least one of a portable communication device (e.g., a smartphone), a computer device, a portable multimedia device, a portable medical device, a camera, a wearable device, and an electrical appliance. The electronic device 101 in accordance with the embodiment of the present disclosure is not limited to the above-described devices.

In the timing controller, the display device, and the driving method thereof in accordance with the present disclosure, various clock training patterns are transmitted, so that ISI jitter, a noise concentration phenomenon, or the like can be coped with.

In the timing controller, the display device, and the driving method thereof in accordance with the present disclosure, configuration information on various clock training patterns are provided in advance, so that the locking time of a clock signal can be decreased.

Example embodiments of the present disclosure have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singularly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device, comprising:

pixels connected to data lines;

a data driver configured to provide data voltages to the data lines; and a timing controller connected to the data driver through a clock training line and a clock data line, wherein the timing controller provides a clock training pattern to the clock data line when the timing controller provides a clock training signal having a first logic level to the clock training line, and provides a clock data signal to the clock data line when the timing controller provides the clock training signal having a second logic level to the clock training line, and wherein the timing controller provides a first configuration signal including period information on a next clock training pattern when the clock training signal having the second logic level is provided to the clock training line.

2. The display device of claim 1, wherein the clock training pattern includes sub-patterns.

3. The display device of claim 2, wherein the first configuration signal includes sub-pattern period setting values indicating periods of the respective sub-patterns.

4. The display device of claim 3, wherein the first configuration signal further includes initial-level period setting values indicating periods in which initial levels of the respective sub-patterns are maintained.

5. The display device of claim 4, wherein each of the sub-patterns includes at least two unit data, wherein the unit data have the same time length, and wherein an initial bit of each of the unit data is a transition bit having a logic level different from a logic level of a previous bit.

6. The display device of claim 5, wherein each of the unit data maintains a third logic level during a first period of its corresponding sub-pattern, and maintains a fourth logic level during a second period of its corresponding sub-pattern.

7. The display device of claim 6, wherein the sub-pattern period setting values indicate a number of the unit data which a corresponding sub-pattern includes.

8. The display device of claim 7, wherein the initial-level period setting values indicate a period in which the third logic level of a first unit data of a corresponding sub-pattern is maintained.

9. The display device of claim 1, wherein the first configuration signal indicates that subsequent data is frame data.

10. The display device of claim 1, wherein the timing controller further provides a second configuration signal when the clock training signal having the second logic level is provided to the clock training line, and wherein the second configuration signal indicates that subsequent data is pixel data or dummy data.

11. A method of driving a display device including: pixels connected to data lines; a data driver configured to provide data voltages to the data lines; and a timing controller connected to the data driver through a clock training line and a clock data line, the method comprising:

providing, from the timing controller, a clock training pattern to the clock data line when the timing controller provides a clock training signal having a first logic level to the clock training line; and providing, from the timing controller, a clock data signal to the clock data line when the timing controller provides the clock training signal having a second logic level to the clock training line, wherein the timing controller provides a first configuration signal including period information on a next clock training pattern when the clock training signal having the second logic level is provided to the clock training line.

12. The method of claim 11, wherein the clock training pattern includes sub-patterns.

13. The method of claim 12, wherein the first configuration signal includes sub-pattern period setting values indicating periods of the respective sub-patterns.

14. The method of claim 13, wherein the first configuration signal further includes initial-level period setting values indicating periods in which initial levels of the respective sub-patterns are maintained.

15. The method of claim 14, wherein each of the sub-patterns includes at least two unit data, wherein the unit data have the same time length, and wherein an initial bit of each of the unit data is a transition bit having a logic level different from a logic level of a previous bit.

16. The method of claim 15, wherein each of the unit data maintains a third logic level during a first period of its corresponding sub-pattern, and maintains a fourth logic level during a second period of its corresponding sub-pattern.

17. The method of claim 16, wherein the sub-pattern period setting values indicate a number of the unit data which a corresponding sub-pattern includes.

18. The method of claim 17, wherein the initial-level period setting values indicate a period in which the third logic level of a first unit data of a corresponding sub-pattern is maintained.

19. The method of claim 11, wherein the first configuration signal indicates that subsequent data is frame data.

20. The method of claim 11, wherein the timing controller further provides a second configuration signal when the clock training signal having the second logic level is provided to the clock training line, and wherein the second configuration signal indicates that subsequent data is pixel data or dummy data.

21. An electronic device comprising:

a timing controller comprising a first terminal and a second terminal, wherein the timing controller is configured to provide a clock training pattern to the second terminal when the timing controller provides a clock training signal having a first logic level to the first terminal, and to provide a clock data signal to the second terminal when the timing controller provides the clock training signal having a second logic level to the first terminal, and wherein the timing controller is further configured to provide a first configuration signal including period information on a next clock training pattern when the clock training signal having the second logic level is provided to the first terminal.

22. The electronic device of claim 21, wherein the clock training pattern includes sub-patterns.

23. The electronic device of claim 22, wherein the first configuration signal includes sub-pattern period setting values indicating periods of the respective sub-patterns.

24. The electronic device of claim 23, wherein the first configuration signal further includes initial-level period setting values indicating periods in which initial levels of the respective sub-patterns are maintained.

25. The electronic device of claim 24, wherein each of the sub-patterns includes at least two unit data, wherein the unit data have the same time length, and wherein an initial bit of each of the unit data is a transition bit having a logic level different from a logic level of a previous bit.

26. The electronic device of claim 25, wherein each of the unit data maintains a third logic level during a first period of its corresponding sub-pattern, and maintains a fourth logic level during a second period of its corresponding sub-pattern.

27. The electronic device of claim 26, wherein the sub-pattern period setting values indicate a number of the unit data which a corresponding sub-pattern includes.

28. The electronic device of claim 27, wherein the initial-level period setting values indicate a period in which the third logic level of a first unit data of a corresponding sub-pattern is maintained.

29. The electronic device of claim 21, wherein the first configuration signal indicates that subsequent data is frame data.

30. The electronic device of claim 21, wherein the timing controller is further configured to provide a second configuration signal when the clock training signal having the second logic level is provided to the first terminal, and wherein the second configuration signal indicates that subsequent data is pixel data or dummy data.

* * * * *